US011874427B2

(12) United States Patent
Jia et al.

(10) Patent No.: US 11,874,427 B2
(45) Date of Patent: Jan. 16, 2024

(54) EXPERIMENTAL APPARATUS AND EXPERIMENTAL METHOD FOR PHYSICAL MODELING OF LITHOSPHERIC STRUCTURAL DEFORMATION

(71) Applicant: NANJING UNIVERSITY, Nanjing (CN)

(72) Inventors: Dong Jia, Nanjing (CN); Xiaojun Wu, Nanjing (CN); Shufeng Yang, Nanjing (CN); Hanlin Chen, Nanjing (CN); Zhuxin Chen, Nanjing (CN); Hongwei Yin, Nanjing (CN); Yiquan Li, Nanjing (CN); Guoai Xie, Nanjing (CN); Yinqi Li, Nanjing (CN); Jianying Yuan, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 565 days.

(21) Appl. No.: 17/201,018

(22) Filed: Mar. 15, 2021

(65) Prior Publication Data

US 2021/0199848 A1 Jul. 1, 2021

(51) Int. Cl.
*G01V 99/00* (2009.01)
*G01V 8/10* (2006.01)

(52) U.S. Cl.
CPC .............. *G01V 99/005* (2013.01); *G01V 8/10* (2013.01)

(58) Field of Classification Search
CPC ................................ G01V 99/005; G01V 8/10
See application file for complete search history.

(56) References Cited

FOREIGN PATENT DOCUMENTS

| CN | 2857006 Y | * | 1/2007 | ............. G01N 33/00 |
|---|---|---|---|---|
| CN | 109166441 A | * | 1/2019 | ............. G09B 23/40 |
| CN | 109493705 A | * | 3/2019 | ............. G09B 23/40 |
| CN | 106841028 B | * | 7/2023 | ............. G01N 19/00 |

OTHER PUBLICATIONS

Hou YJ. Development of geotechnical centrifuges and facilities in China. InPhysical Modelling in Geotechnics, vol. 1 Jul. 11, 2018 (pp. 77-85). CRC Press. (Year: 2018).*

* cited by examiner

*Primary Examiner* — Chuen-Meei Gan
(74) *Attorney, Agent, or Firm* — CBM PATENT CONSULTING, LLC

(57) ABSTRACT

The present invention discloses an experimental apparatus and experimental method for physical modeling of lithospheric structural deformation. The experimental apparatus comprises a drum centrifuge capsule, a drum centrifuge driving power compartment, a structural deformation device control system and a motion control system; a basket is hung at each end of a cantilever of the centrifuge, a structural deformation experiment box is placed in the basket, and the structural deformation control system accurately controls the deformation of experimental materials in the experiment box and can model structural deformation processes at various lithospheric scales. The experimental apparatus further comprises real-time monitoring cameras and a high-speed image acquisition device.

6 Claims, 2 Drawing Sheets

EXPERIMENTAL APPARATUS AND EXPERIMENTAL METHOD FOR PHYSICAL MODELING OF LITHOSPHERIC STRUCTURAL DEFORMATION

This application claims priority to Chinese Patent Application Ser. No. CN202110076865.6 filed on 20 Jan. 2021.

TECHNICAL FIELD

The present invention relates to an experimental apparatus and experimental method for physical modeling, in particular to an experimental apparatus and experimental method for a physical modeling experiment of lithospheric structural deformation.

BACKGROUND

Physical modeling for structural deformation is a method capable of modeling and studying large-scale structural deformation under laboratory conditions, and have wide applicability. Physical modeling experiments in a hypergravity environment created by centrifuges have made great progress in the middle of last century. In recent decades, scholars have made great progress in the research fields of lithospheric rift extension, mid-ocean ridge spreading mechanism, fold-and-thrust structure, strike-slip pull-apart structure, gypsum-salt and magma diapir structure through hypergravity structural physical modeling experiments using centrifuges.

Centrifuges generating the hypergravity environment can generally be divided into two types: large long-arm centrifuges and small drum centrifuges.

At present, due to the turntable rotating structure of drum centrifuges, and small size of experiment boxes for structural physical modeling, ranging from a few centimeters to more than ten centimeters, it is difficult to accurately model the actual geological structure. In addition, structural experiment boxes can only be originally arranged on centrifuge turntables fixedly, which restricts experimental materials to viscous materials, so that loose experimental materials cannot be used. The experiment boxes for structural physical modeling are not provided with power-driven equipment, so that the deformation rate cannot be accurately controlled, and the deformation of experimental materials cannot be accurately controlled when the running acceleration is greater than 300 g. Therefore, the existing drum centrifuges cannot meet the needs of structural physical modeling.

At present, the maximum acceleration of rotating arm geotechnical centrifuges is less than 600 g, and power-driven devices in experiment modules can only be controlled below 300 g. When the running acceleration is greater than 300 g, power-driven equipment in experiment modules cannot be controlled, and the deformation of experimental materials cannot be accurately controlled. With complex structures and extremely high costs, centrifuges having high power consumption cannot meet cost control for long-term operation of structural physical modeling experiments. Therefore, the existing rotating arm geotechnical centrifuges cannot meet the needs of structural physical modeling.

SUMMARY

Purpose of the present invention: The present invention aims to provide an experimental apparatus for lithospheric structural deformation in a hypergravity environment with high control accuracy and real-time image monitoring, and an experimental method using the apparatus.

Technical solution: The experimental apparatus for physical modeling of lithospheric structural deformation of the present invention comprises a drum centrifuge capsule and a structural deformation device control system; wherein the drum centrifuge capsule comprises rotating arms, a basket and basket experiment module is installed at each end of the rotating arms in a hanging manner, and a structural deformation experiment box is installed in the basket and basket experiment module; a power-driven control device is arranged in the structural deformation experiment box, and the structural deformation device control system is connected with the power-driven control device.

The centrifuge capsule further comprises a centrifuge capsule body, a capsule cover and a main rotating shaft; the main rotating shaft runs through the centrifuge capsule body, a sealing shaft is installed at an interface, a slip ring device is sleeved at one end of the main rotating shaft in the centrifuge capsule body, and a centrifuge instrument compartment is installed at the other end.

The slip ring device is provided with an electric slip ring for supplying power to equipment, a weak current slip ring for transmitting test data in real time, an optical fiber slip ring for transmitting optical fiber strain data in real time and a liquid slip ring for transmitting liquid.

Real-time monitoring cameras for acquiring top images of structural deformation in real time are installed in the middle of the two rotating arms; and a high-speed image acquisition device for acquiring side images of structural deformation in real time is installed on the bulkhead of the centrifugal capsule body.

The experimental apparatus of the present invention further comprises a drum centrifuge driving power compartment comprising a driving compartment body, a driving compartment door and a compartment body support; a drive motor, a vacuum motor and a water-cooled motor are installed inside the driving compartment body; and the upper part of the drive motor is equipped with a rotary brake and is connected with the main rotating shaft.

The structural deformation device control system comprises an experiment box control cabinet and an experiment box console; and the experiment box control cabinet is connected with a liquid container.

The experimental apparatus of the present invention further comprises a motion control system, wherein the motion control system comprises a centrifuge control cabinet and a centrifuge console.

An experimental method for physical modeling of lithospheric structural deformation of the present invention comprises the following steps:
(a) placing experimental materials in the structural deformation experiment box, installing a basket and basket experiment module at one end of each of the rotating arms, and installing an experiment module or a counterweight with the same weight at the other end;
(b) turning on relevant equipment;
(c) testing relevant parameters, and recording top and side deformation images of the structural deformation experiment box; and
(d) taking out the structural deformation experiment box after the structural deformation experiment.

Advantageous effects: compared with the prior art, the present invention has the following remarkable advantages: 1. the experiment box is hung on the cantilever of the drum centrifuge, so that the physical modeling experiment for lithospheric structural deformation in a 2500 g hypergravity environment is realized; 2. the lithospheric structural deformation rate can be controlled, with the control accuracy up to 0.01 mm/s; 3. the experimental space is large, with a size greater than 400 mm×400 mm×300 mm; 5. the image acquisition equipment is installed on each of the rotating arms and the capsule body to acquire top and side images of structural deformation in real time, avoiding damage to the equipment resulting from centrifugal force; and 6. the experimental apparatus is simple in structure and cost-saving.

DETAILED DESCRIPTION

The technical solutions of the present invention will be further described with reference to the accompanying drawings.

Figure 1:
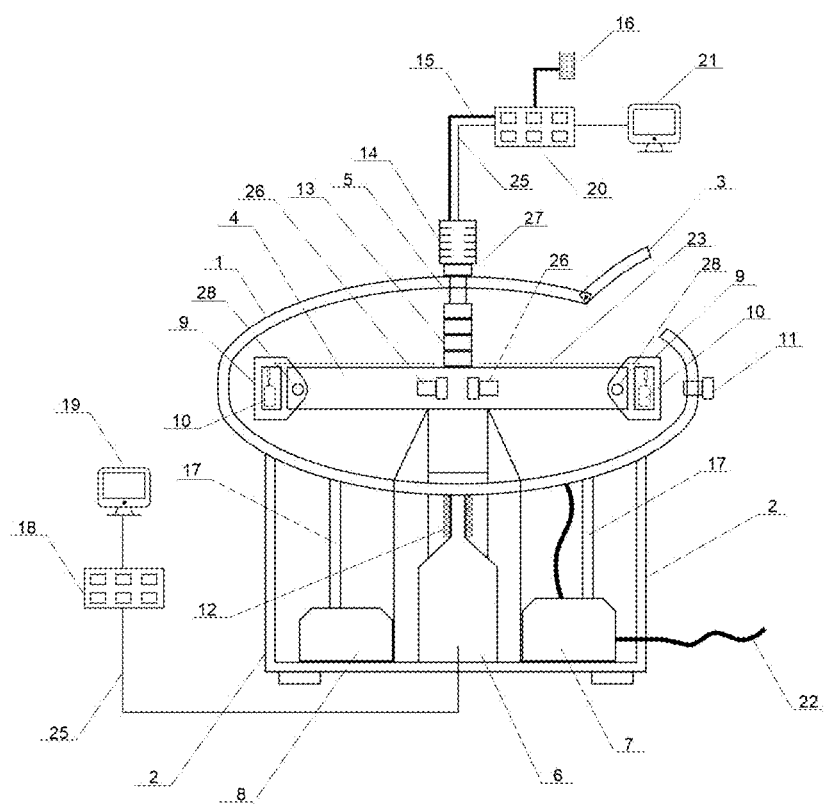
FIG. 1 is a side view of the experimental apparatus of the present invention.
Figure 2:
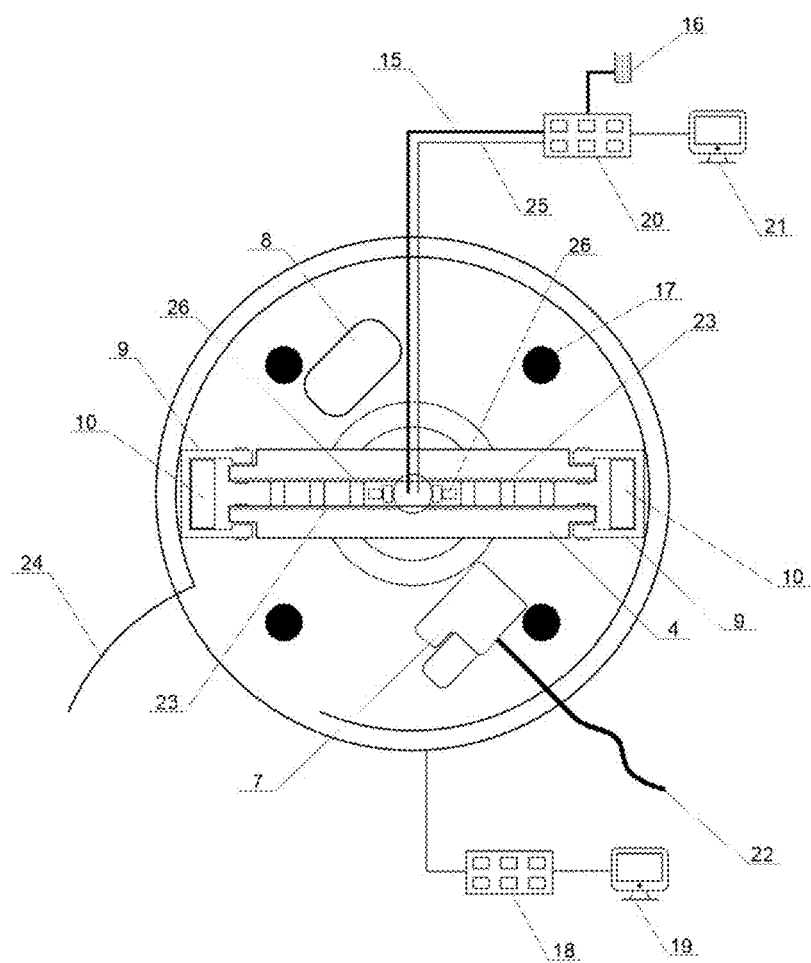
FIG. 2 is a top view of the experimental apparatus of the present invention.

The experimental apparatus of the present invention is suitable for a physical modeling experiment for lithospheric structural deformation in a 10-2500 g centrifugal hypergravity environment, and particularly suitable for a physical modeling experiment environment for lithospheric structural deformation in a 300-2500 g centrifugal hypergravity environment. As shown in FIG. 1 and FIG. 2, the experimental apparatus of the present invention comprises a drum centrifuge capsule, a drum centrifuge driving power compartment, a drum centrifuge motion control system and a structural deformation device control system.

The drum centrifuge capsule comprises a centrifuge capsule body 1, a capsule cover 3, rotating arms 4 and a main rotating shaft 5; two real-time monitoring cameras 26 symmetrical along the main rotating shaft 5 are installed in the middle of the two rotating arms 4 to acquire top structural deformation data of a structural deformation experiment box 10 in the basket in real time; a basket and basket experiment module 9 is installed at each end of the rotating arms 4 through a basket hanging device 28 in a hanging manner, the structural deformation experiment box 10 is installed in the basket and basket experiment module 9, and a power-driven control device is arranged in the experiment box.

The main rotating shaft 5 runs through the centrifuge capsule body 1, a rotating sealing shaft 27 for sealing is installed at an interface, a slip ring device 13 is sleeved at one end of the main rotating shaft 5 in the centrifuge capsule body 1, and a centrifuge instrument compartment 14 is installed at the other end of the main rotating shaft 5 outside the centrifuge capsule body 1. A high-speed image acquisition device 11 is also installed on the bulkhead of the centrifuge capsule to acquire side structural deformation data of the structural deformation experiment box 10 in the basket in real time.

The drum centrifuge driving power compartment comprises a driving power compartment body 2, a driving compartment door 24 and a compartment body support 17; a drive motor 6 is installed inside the driving power compartment body 2, the upper part of the drive motor 6 is equipped with a rotary brake 12 and is connected with the main rotating shaft 5 in the centrifuge capsule for controlling the braking of the centrifuge; a vacuum motor 7 and a water-cooled motor 8 are installed at the left and right sides of the drive motor 6 respectively; and the vacuum motor 7 is provided with a vacuum tube 22 connected with the centrifuge capsule body 1 for vacuumizing the centrifuge capsule.

The experimental apparatus of the present invention further comprises necessary shock absorbers, seal fittings, drive sensors and connecting lines.

The slip ring device 13 comprises an electric slip ring, a weak current slip ring, an optical fiber slip ring and a liquid slip ring. Through the slip ring device 13, a 0-220 V voltage, a weak current signal, an optical fiber signal and a liquid pipeline 15 can be accessed to the drum centrifuge capsule for providing power and test data. A trough fixing device 23 is installed on the surface of each of the rotating arms 4 of the centrifuge for fixing the pipeline connected to the basket and basket experiment module 9.

The drum centrifuge motion control system comprises a centrifuge control cabinet 18 and a centrifuge console 19; the centrifuge control cabinet 18 is connected with the centrifuge drive motor 6 through a control pipeline 25; and the centrifuge console 19 is configured for controlling the centrifuge control cabinet 18.

The structural deformation device control system of the drum centrifuge comprises an experiment box control cabinet 20 and an experiment box console 21; the experiment box control cabinet 20 is connected with a liquid container 16 for containing various liquids input into the experiment box, and inputting or outputting the liquids into the experiment box 10 through a liquid pipeline 15; the experiment box control cabinet 20 is connected with the power-driven control device in the structural deformation experiment box 10 through a control pipeline 25 to provide accurate power control for the structural deformation experiment box 10 and drive the materials in the structural deformation experiment box to deform, including motor and hydraulic power drive; and the experiment box console 21 is configured for controlling the experiment box control cabinet 20.

When the drum centrifuge is running, the basket and basket experiment module 9 is hung in parallel on the rotating arms 4 due to centrifugal action, and the centrifugal force generated by the rotating arms 4 at the bottom of the basket and basket experiment module 9 is up to 2500 g; the experimental materials in the structural deformation experiment box 10 inside the basket and basket experiment module 9 are generally loose quartz sand. Under the drive of the structural deformation device control system, structural deformation processes such as compression, extension, strike-slip and diapir at lithospheric scale in nature are modeled, with the power drive accurate to 0.01 mm/s. Therefore, the physical modeling experiment for lithospheric structural deformation is more convenient. Compared with conventional turntable drum centrifuges, the experimental model at the same scale has an internal stress increased by more than ten times, which enables the modeling experiment to be closer to the natural conditions. Compared with conventional long-arm centrifuges, the centrifuge used herein is simple in structure and cost-saving.

The inner space of the drum centrifuge capsule is larger than 400 mm×400 mm×300 mm. The load capacity of the drum centrifuge capsule is up to 60 kg when the centrifugal force is 2500 g, and up to 100 kg when the centrifugal force is 1000 g.

When the drum centrifuge is running, test data from inspection equipment in the basket and basket experiment module 9 are transmitted in real time through a weak current signal accessed through the slip ring device 13, including temperature, pressure, stress, strain and endoscopic images. Optical fiber strain data in the basket and basket experiment module 9 can be transmitted in real time through optical fiber connection; and the liquid connecting pipe can input or output various liquids into or from the experiment module at accurately controlled input or output rate and pressure.

Experimental Method (1) Placing experimental materials in the structural deformation experiment box 10, and weighing the structural deformation experiment box 10, in g; putting the structural deformation experiment box 10 into the basket and basket experiment module 9 in the drum centrifuge, connecting the structural deformation experiment box 10 with the external experiment box control cabinet 20, the experiment box console 21 and the liquid container 16 through pipelines on the trough fixing device 23, and fixing relevant pipelines.

The structural deformation experiment box 10 can be installed in two states: 1. for the experiment using a single structural deformation experiment box, it is only required to put the structural deformation experiment box 10 in one basket and basket experiment module 9, and put a counterweight with the same weight as the structural deformation experiment box 10 in the other basket and basket experiment module 9 at the other end; and 2. for the experiment using double structural deformation experiment boxes, experiment boxes are placed into the two baskets and basket experiment modules 9, and the weight of the two structural deformation experiment boxes 10 should be kept equal.

(2) Closing the capsule cover 3, turning on all control power as required, setting parameters of the vacuum motor 7 and turning on the vacuum motor 7; turning on the water-cooled motor 8 when the vacuum value in the centrifuge capsule body 1 reaches a set value, setting preset operation-related parameters of the centrifuge, and turning on the centrifuge drive motor 6 to drive the rotating arms 4 in the centrifuge capsule body 1 to rotate and reach the preset maximum centrifugal acceleration.

(3) Turning on power drive for the structural deformation experiment and starting to record test data of the structural deformation experiment; turning on the high-speed image acquisition device 11 to record side deformation images of the structural deformation experiment box; and turning on the real-time monitoring cameras 26 to record top deformation images of the structural deformation experiment box.

(4) At the end of the structural deformation experiment, stopping the automatic experiment box console 21 and the centrifuge console 19, stopping the water-cooled motor 8 and the vacuum motor 7, relieving pressure from the centrifuge capsule body 1, opening the capsule cover 3, and taking out the structural deformation experiment box 10 to complete the experiment.

What is claimed is:

1. An experimental apparatus for physical modeling of lithospheric structural deformation, comprising a drum centrifuge capsule and a structural deformation device control system; wherein the drum centrifuge capsule comprises rotating arms (4), a basket and basket experiment module (9) is installed at each end of the rotating arms (4) in a hanging manner, and a structural deformation experiment box (10) is installed in the basket and basket experiment module (9); a power-driven control device is arranged in the structural deformation experiment box (10), and the structural deformation device control system is connected with the power-driven control device;

wherein the centrifuge capsule further comprises a centrifuge capsule body (1), a capsule cover (3), and a main rotating shaft (5) and a sealing shaft (27); a slip ring device (13) is arranged on the main rotating shaft (5); real-time monitoring cameras (26) for acquiring top images of structural deformation in real time are installed in the middle of the two rotating arms (4); and a high-speed image acquisition device (11) for acquiring side images of structural deformation in real time is installed on the bulkhead of the centrifugal capsule body (1).

2. The experimental apparatus for physical modeling of lithospheric structural deformation according to claim 1, wherein the slip ring device (13) is provided with an electric slip ring for supplying power to equipment, a weak current slip ring for transmitting test data in real time, an optical fiber slip ring for transmitting optical fiber strain data in real time and a liquid slip ring for transmitting liquid.

3. The experimental apparatus for physical modeling of lithospheric structural deformation according to claim 1, further comprising a drum centrifuge driving power compartment, wherein the drum centrifuge driving power compartment comprises a driving compartment body (2), a driving compartment door (24) and a compartment body support (17); a drive motor (6), a vacuum motor (7) and a water-cooled motor (8) are installed inside the driving compartment body (2).

4. The experimental apparatus for physical modeling of lithospheric structural deformation according to claim 1, wherein the structural deformation device control system comprises an experiment box control cabinet (20) and an experiment box console (21); and the experiment box control cabinet (20) is connected with a liquid container (16).

5. The experimental apparatus for physical modeling of lithospheric structural deformation according to claim 1, further comprising a motion control system, wherein the motion control system comprises a centrifuge control cabinet (18) and a centrifuge console (19).

6. An experimental method using the experimental apparatus for physical modeling of lithospheric structural deformation according to claim 1, comprising the following steps:

(a) placing experimental materials in the structural deformation experiment box (10), installing the basket and basket experiment module (9) at one end of each of the rotating arms (4), and installing an experiment module or a counterweight with the same weight at the other end;

(b) turning on relevant equipment;

(c) testing relevant parameters, and recording top and side deformation images of the structural deformation experiment box (10); and (d) taking out the structural deformation experiment box (10) after the structural deformation experiment.

* * * * *